(12) United States Patent
Kretschmann

(10) Patent No.: US 9,669,664 B2
(45) Date of Patent: Jun. 6, 2017

(54) METHOD, CONTROL DEVICE AND SYSTEM FOR DETERMINING A TREAD DEPTH OF A TREAD OF A TIRE

(71) Applicant: CONTINENTAL AUTOMOTIVE GMBH, Hannover (DE)

(72) Inventor: Matthias Kretschmann, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/423,189

(22) PCT Filed: Sep. 19, 2013

(86) PCT No.: PCT/EP2013/069434
§ 371 (c)(1),
(2) Date: Feb. 23, 2015

(87) PCT Pub. No.: WO2014/053322
PCT Pub. Date: Apr. 10, 2014

(65) Prior Publication Data
US 2015/0239298 A1    Aug. 27, 2015

(30) Foreign Application Priority Data

Oct. 1, 2012   (DE) .................. 10 2012 217 901

(51) Int. Cl.
*B60C 11/24*     (2006.01)
*G07C 5/00*      (2006.01)
*G07C 5/08*      (2006.01)

(52) U.S. Cl.
CPC .......... *B60C 11/246* (2013.04); *B60C 11/243* (2013.04); *G07C 5/006* (2013.01); *G07C 5/0808* (2013.01)

(58) Field of Classification Search
CPC ..... B60C 11/246; B60C 11/243; G07C 5/006; G07C 5/0808
(Continued)

(56) References Cited

U.S. PATENT DOCUMENTS 6,313,742 B1   11/2001   Larson
6,327,904 B1   12/2001   Oldenettel
(Continued)

FOREIGN PATENT DOCUMENTS

CN   101932458 A   12/2010
CN   102196928 A    9/2011
(Continued)

OTHER PUBLICATIONS

Machine Translation: Nakao, Japanese Patent Publication JP 2008247126 A, Oct. 2008.*
(Continued)

*Primary Examiner* — Mussa A Shaawat
*Assistant Examiner* — Nadeem Odeh
(74) *Attorney, Agent, or Firm* — Laurence A. Greenberg; Werner H. Stemer; Ralph E. Locher

(57) ABSTRACT

A method for determining a tire tread depth during operation of a vehicle includes determining an instantaneous rotational speed of a vehicle wheel having the tire based on data determined by at least one first sensor, then determining a vehicle speed based on data determined by at least one different second sensor, then determining an instantaneous dynamic wheel radius based on the determined instantaneous rotational speed and the determined instantaneous speed. At least one first tire parameter selected from an instantaneous tire temperature, tire pressure and tire load is determined. An instantaneous dynamic inner wheel radius is determined based on the at least one determined first parameter, wherein the inner wheel radius is the distance between
(Continued)

the center of the wheel and the tire-side start or seam of the tread. A tire tread depth is determined based on the determined instantaneous dynamic radius and the determined instantaneous dynamic inner radius.

12 Claims, 5 Drawing Sheets

(58) Field of Classification Search
USPC ......................................................... 701/33.7
See application file for complete search history.

(56) References Cited

U.S. PATENT DOCUMENTS

| | | |
|---|---|---|
| 8,558,680 B2 | 10/2013 | Pannek |
| 8,775,017 B2 | 7/2014 | Brusarosco |
| 2008/0091315 A1 | 4/2008 | Krokel et al. |
| 2010/0060443 A1 | 3/2010 | Wakao et al. |
| 2010/0174437 A1* | 7/2010 | Benedict ............... B60T 8/1725 701/31.4 |
| 2010/0295669 A1* | 11/2010 | Pannek ................... B60C 11/24 340/438 |

FOREIGN PATENT DOCUMENTS

| | | | | |
|---|---|---|---|---|
| DE | 197 16 586 C1 | 8/1998 | | |
| DE | 10304126 A1 | 8/2004 | | |
| DE | 10306498 A1 | 8/2004 | | |
| DE | 102005052476 A1 * | 5/2007 | ............ | B60C 11/24 |
| DE | 102008045619 A1 | 3/2010 | | |
| DE | 102010016551 A1 | 10/2011 | | |
| JP | 2008247126 A | 10/2008 | | |
| WO | 0212003 A2 | 2/2002 | | |

OTHER PUBLICATIONS

Machine Translation: Maggiora et al., German Patent Publication No. DE102005052476 A1, May 2007.*

* cited by examiner

METHOD, CONTROL DEVICE AND SYSTEM FOR DETERMINING A TREAD DEPTH OF A TREAD OF A TIRE

BACKGROUND OF THE INVENTION

Field of the Invention

The invention relates to a method for determining a tread depth of a tread of a tire during operation of a vehicle having the tire, and to a control device and a system for a vehicle for determining a tread depth of a tread of a tire of the vehicle.

WO 02/12003 A2 discloses a device for monitoring the state of each of a plurality of wheels of a vehicle. The device has a computer, a wheel rotational speed-determining system which generates wheel rotational speeds with respect to each wheel and is coupled to the computer in order to transmit rotational speed signals for each wheel to the computer, and a vehicle speed signal generator. In addition, the device has a computer memory in which data is stored which relates to tire wear rates for tires mounted on each of the wheels, the distance traveled by the tire since installation, distance traveled during the instantaneous journey, average wheel rotational speeds and a scaling factor for estimating the wheel speed on the basis of the vehicle speed signal. In addition, the device has a stored program to be run on the computer for referencing the stored data when wheel speeds outside a tolerance limit which characterize compressed operating conditions are determined.

BRIEF SUMMARY OF THE INVENTION

The object of the invention is to specify a method, a control device and a system for determining a tread depth of a tread of a tire which permit improved determination of the tread depth during operation of a vehicle having the tire.

This object is achieved with the subject matters of the independent claims. Advantageous developments can be found in the dependent claims.

A method for determining a tread depth of a tread of a tire during operation of a vehicle having the tire has, according to one aspect of the invention, the following steps. An instantaneous rotational speed of a wheel of the vehicle having the tire is determined on the basis of data determined by at least one first sensor. In addition, an instantaneous speed of the vehicle is determined on the basis of data determined by at least one second sensor which is different from the at least one first sensor. Furthermore, an instantaneous dynamic radius of the wheel having the tire is determined on the basis of the determined instantaneous rotational speed and the determined instantaneous speed. In addition, at least one first parameter of the tire, selected from the group composed of an instantaneous tire temperature, an instantaneous tire pressure and an instantaneous tire load, is determined. Furthermore, an instantaneous dynamic internal radius of the wheel is determined on the basis of the at least one determined first parameter. The internal radius of the wheel is here the distance between the wheel center and the tire-side start of the tread. In addition, a tread depth of the tread of the tire is determined on the basis of the determined instantaneous dynamic radius and the determined instantaneous dynamic internal radius.

In this context, and in the text which follows, the instantaneous dynamic radius is understood to be that radius which a rigid wheel has in order to have, at a specific speed, the same rolling circumference which the wheel having the tire has at this speed. The rolling circumference is here the distance which a wheel travels without slip during one rotation. The dynamic radius is also referred to as the dynamic wheel radius or dynamic rolling radius. The instantaneous dynamic internal radius is the distance between the wheel center and the tire-side start of the tread of the specified rigid wheel, that is to say of a wheel which, at a specific speed, has the same rolling circumference which the wheel having the tire has at this speed.

The method according to the specified embodiment permits improved determination of the tread depth of the tire during operation of the vehicle. This is done, in particular, by determining the instantaneous dynamic radius, determining the instantaneous dynamic internal radius of the wheel on the basis of the at least one determined first parameter, and determining the tread depth on the basis of the specified variable. In this context, as is explained in more detail below, the basis is the consideration that the dynamic radius of the wheel is composed of the instantaneous dynamic internal radius of the wheel and the tread depth of the tread of the tire, and the instantaneous dynamic internal radius of the wheel depends on the at least one first parameter. By determining the at least one first parameter it is therefore possible to determine the respective instantaneous dynamic internal radius of the wheel and therefore the tread depth can be determined as precisely as possible.

The at least one first sensor is typically embodied as a rotational speed sensor, that is to say the instantaneous rotational speed of the wheel is determined in this embodiment on the basis of data determined by at least one rotational speed sensor. As a result, the rotational speed of the wheel can be determined in an easy and reliable way. The determination of the instantaneous rotational speed of the wheel typically includes here determining an instantaneous angular speed of the wheel.

The at least one second sensor is preferably selected from the group composed of a satellite-assisted position-determining sensor, a radar sensor, a lidar sensor, an ultrasonic sensor and an optical camera. By means of the specified sensors, the instantaneous speed of the vehicle can be determined independently of a rotational-speed-based speed determination, and therefore an independent vehicle reference speed can be made available for the determination of the instantaneous dynamic radius and therefore the determination of the tread depth.

In a further embodiment of the method, the instantaneous dynamic internal radius of the wheel is additionally determined on the basis of the determined instantaneous speed of the vehicle. In this context, the basis is the consideration that the instantaneous dynamic internal radius of the wheel additionally depends on the instantaneous speed as well as the already specified variables. The respective instantaneous dynamic internal radius of the wheel can therefore be determined to a further improved degree by means of the specified embodiment.

In addition, the instantaneous dynamic internal radius of the wheel can be determined on the basis of a type of tire and/or the age of the tire. The specified parameters can also influence the internal radius of the wheel and are therefore preferably likewise taken into account during the determination of the internal radius.

The instantaneous dynamic internal radius of the wheel is determined, for example, by means of at least one characteristic curve which is stored in a memory device. The at least one characteristic curve gives here the relationship between the at least one first parameter of the tire and the internal radius of the wheel, the speed of the vehicle and the internal radius of the wheel, the type of tire and the internal radius of the wheel and/or the age of the tire and the internal radius of the wheel.

The at least one characteristic curve can be based on a model of the wheel, that is to say the relationship between the specified variables and the internal radius of the wheel is already stored in advance in the memory device in this embodiment. Furthermore, the at least one characteristic curve can be determined during a driving operation of the vehicle. In the last-mentioned embodiment, the respective characteristic curve is therefore firstly determined in a learning phase, typically after a new wheel has been mounted on the vehicle, and is then used for determining the instantaneous dynamic internal radius.

In a further embodiment of the method, at least one second parameter, selected from the group composed of an instantaneous acceleration of the vehicle, an instantaneous yaw rate of the vehicle, an instantaneous steering angle, an instantaneous torque of a drive engine of the vehicle and an operating state of a brake device of the vehicle, is additionally determined. In this embodiment, the tread depth of the tread of the tire is additionally determined as a function of the at least one determined second parameter. In this context, the basis is the consideration that the tread depth can be determined as precisely as possible during driving situations in which the influence of drive slip or brake slip is low and the vehicle is moved in a straight line. By means of the specified parameters it is easily possible to identify such driving situations and at the same time the influence of drive slip or brake slip and curvature of the roadway can be additionally compensated.

In addition, a warning message can be issued if the determined tread depth of the tread of the tire undershoots a first predetermined threshold value. The warning message can be issued inside the vehicle here. As a result, the occupants of the vehicle, in particular the driver of the vehicle, can be informed of a low tread depth. In addition, the warning message can be transmitted to further vehicles by means of a vehicle-to-vehicle communication device.

In one embodiment of the method, a service device is additionally automatically informed if the determined tread depth of the tread of the tire undershoots a second predetermined threshold value. The second predetermined threshold value can correspond here to the first predetermined threshold value or may be different therefrom. As a result, for example the arrangement of an appointment for the tire to be replaced can be automatically initiated.

In a further embodiment of the method, the determined tread depth of the tread of the tire is transmitted to at least one driver assistance system of the vehicle. The determined tread depth is therefore made available to at least one driver assistance system in the specified embodiment. As a result, the operation of the driver assistance system can be adapted to the respective determined tread depth. The at least one driver assistance system is selected here, for example, from the group composed of an anti-lock brake system, a vehicle movement dynamics control system, in particular an electronic stability program, and an emergency brake system.

The invention also relates to a control device for a vehicle for determining a tread depth of a tread of a tire of the vehicle. The control device has at least one receiver device which is designed to receive an instantaneous rotational speed of a wheel of the vehicle having the tire, an instantaneous speed of the vehicle and at least one first parameter of the tire selected from the group composed of an instantaneous tire temperature, an instantaneous tire pressure and an instantaneous tire load. In addition, the control device has a first determining device which is designed to determine an instantaneous dynamic radius of the wheel having the tire on the basis of the received instantaneous rotational speed and the received instantaneous speed. In addition, the control device has a second determining device which is designed to determine an instantaneous dynamic internal radius of the wheel on the basis of the at least one received first parameter. The internal radius of the wheel is here the distance between the wheel center and the tire-side start of the tread.

Furthermore, the control device has a third determining device which is designed to determine a tread depth of the tread of the tire on the basis of the determined instantaneous dynamic radius and the determined instantaneous dynamic internal radius.

The control device can be embodied as a stand-alone control device for the vehicle or can be a component of a further control device, for example of a control device of an anti-lock brake system or of a vehicle movement dynamics control system.

Furthermore, the invention relates to a system for a vehicle for determining a tread depth of a tread of a tire of the vehicle. The system has a control device according to the specified embodiment, and at least one wheel unit. The at least one wheel unit can be arranged here in the tire and has at least one sensor selected from the group composed of a temperature sensor, a pressure sensor and a tire load sensor.

The control device and the system for determining the tread depth have the advantages already specified in relation to the corresponding methods, which advantages will not be presented once more at this point in order to avoid repetitions, and are suitable, in particular, for carrying out the method according to the invention, wherein this can also relate to the embodiments and developments. For this purpose, the control device and the system can have further suitable devices and components.

BRIEF DESCRIPTION OF THE SEVERAL VIEWS OF THE DRAWING

Embodiments of the invention will now be explained in more detail with reference to the appended figures.

DESCRIPTION OF THE INVENTION

Figure 1:
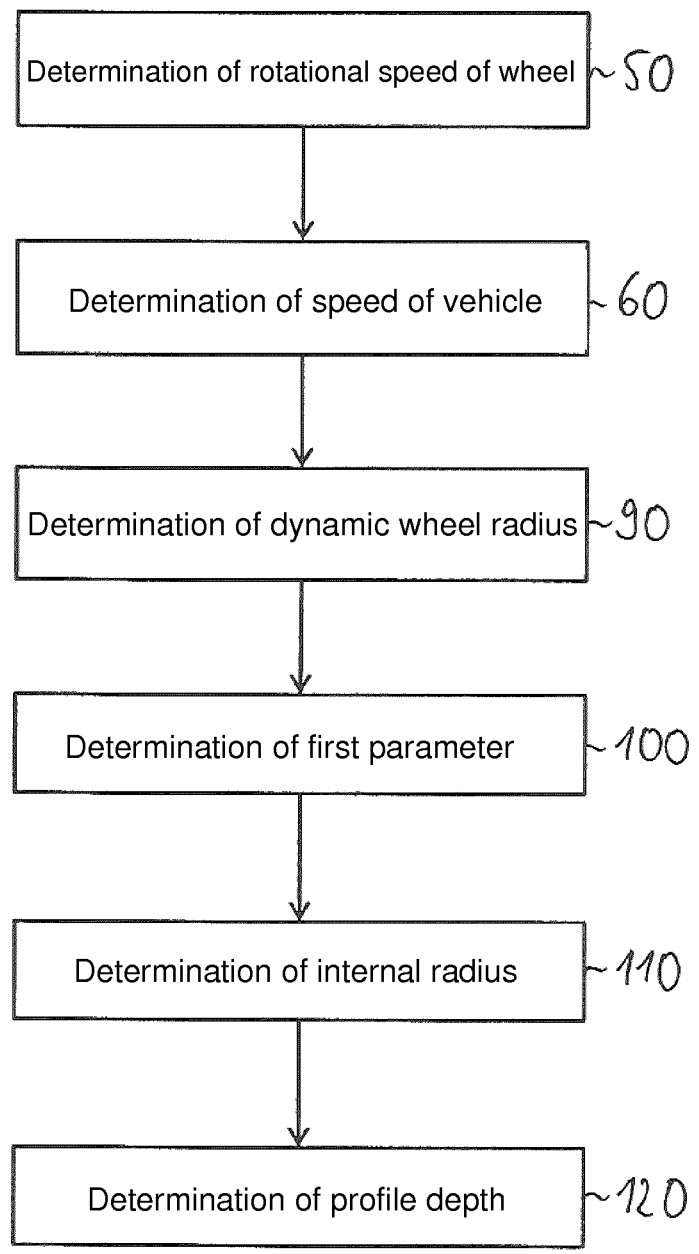
FIG. 1 shows a flowchart of a method for determining a tread depth of a tread of a tire according to a first embodiment.

FIG. 1 shows a flowchart of a method for determining a tread depth of a tread of a tire during operation of a vehicle having the tire, according to a first embodiment. The vehicle is typically a motor vehicle, for example a passenger car or a truck.

In a step 50, an instantaneous rotational speed of a wheel of the vehicle having the tire is determined on the basis of data determined by at least one first sensor. For example, an instantaneous angular speed ω of the wheel is determined.

The at least one first sensor is preferably embodied as a rotational speed sensor for this purpose.

In a step 60, an instantaneous speed $v_{ref}$ of the vehicle, that is to say the longitudinal speed of the vehicle, is determined on the basis of data determined by at least one second sensor which is different from the at least one first sensor. The determination of the instantaneous speed $v_{ref}$ typically includes determining a value of a distance traveled by the vehicle in a specific time interval, on the basis of data determined by the at least one second sensor. The at least one second sensor is embodied, for example, as a satellite-assisted position-determining sensor for this purpose. Furthermore, the at least one second sensor can be embodied as a radar sensor, lidar sensor, ultrasonic sensor or optical camera, and therefore a distance of the vehicle from objects which are detected as positionally fixed can be determined at various times, and the distance traveled by the vehicle can be determined therefrom.

Furthermore, in a step 90, an instantaneous dynamic radius R of the wheel having the tire is determined on the basis of the determined instantaneous rotational speed and the determined instantaneous speed. This is done in the embodiment shown by means of the relationship $v_{ref}=R\cdot\omega$, where $v_{ref}$ is, as already explained, the instantaneous speed of the vehicle, R is the instantaneous dynamic radius of the wheel and $\omega$ is the instantaneous rotational speed of the wheel.

In a step 100, at least one first parameter of the tire is determined, wherein the at least one first parameter is selected from the group composed of an instantaneous tire temperature T, an instantaneous tire pressure P and an instantaneous tire load. Preferably all of the specified parameters are determined here. The specified parameters are typically determined by means of a wheel unit which is arranged in the tire, as is explained in more detail in relation to the further figures.

Furthermore, in a step 110, an instantaneous dynamic internal radius $r^0$ of the wheel is determined on the basis of the at least one determined first parameter and the determined instantaneous speed $v_{ref}$ and the type of the tire, wherein the type of the tire is stored, for example, in a memory device of the wheel unit. The internal radius $r^0$ of the wheel is here the distance between the wheel center and the tire-side start of the tread. The instantaneous dynamic internal radius $r^0$ of the wheel is preferably determined by means of at least one characteristic curve which is stored in a memory device.

The instantaneous dynamic internal radius $r^0$ of the wheel typically increases here as the tire temperature rises and the tire pressure rises. In contrast, an increasing tire load typically leads to a reduction in the instantaneous dynamic internal radius $r^0$. As the instantaneous speed of the vehicle rises, the instantaneous dynamic internal radius $r^0$ typically increases, wherein the increase in the internal radius $r^0$ typically reaches saturation when a specific speed range is reached.

The specified dependencies can be taken into account by determining the at least one first parameter and the instantaneous speed $v_{ref}$ and the type of the tire during the determination of the instantaneous dynamic internal radius $r^0$ of the wheel, and can therefore be compensated.

In addition, in a step 120, a tread depth $t_P$ of the tread of the tire is determined on the basis of the determined instantaneous dynamic radius R and the determined instantaneous dynamic internal radius $r^0$. This is done in the embodiment shown on the basis of the relationships $v_{ref}=[r^0(v_{ref}, T, P, \text{tire load, type of tire})+t_P]\cdot\omega$ and $v_{ref}=R\cdot\omega$. From these, the relationship $R=r^0(v_{ref}, T, P, \text{tire load, type of tire})+t_P$ is obtained, by means of which relationship the tread depth $t_P$ can be determined.

$t_P$ is here in the embodiment shown a measure of the dynamic behavior of the tread depth of the tread of the rigid wheel which has already been explained and which has, at a specific speed, the same rolling circumference which the wheel having the tire has at this speed. The determined value therefore characterizes the behavior of the tread depth in the driving operation of the vehicle, wherein during the determination of the value it is assumed that there is a rigid wheel which is equivalent to the wheel of the vehicle.

The steps 50 to 120 are typically carried out continuously during operation of the vehicle, that is to say the tread depth is determined continuously during the driving operation. In this context, it is possible to determine both an absolute value of the tread depth and also a relative change in the tread depth with respect to a previously determined value.

The tread depth is preferably determined here for all the tires of the vehicle, that is to say the instantaneous rotational speed, the instantaneous dynamic radius, the at least one first parameter and the instantaneous dynamic internal radius are determined separately for each tire or each wheel. The tread depth is subsequently determined for each tire from these values.

Figure 2:
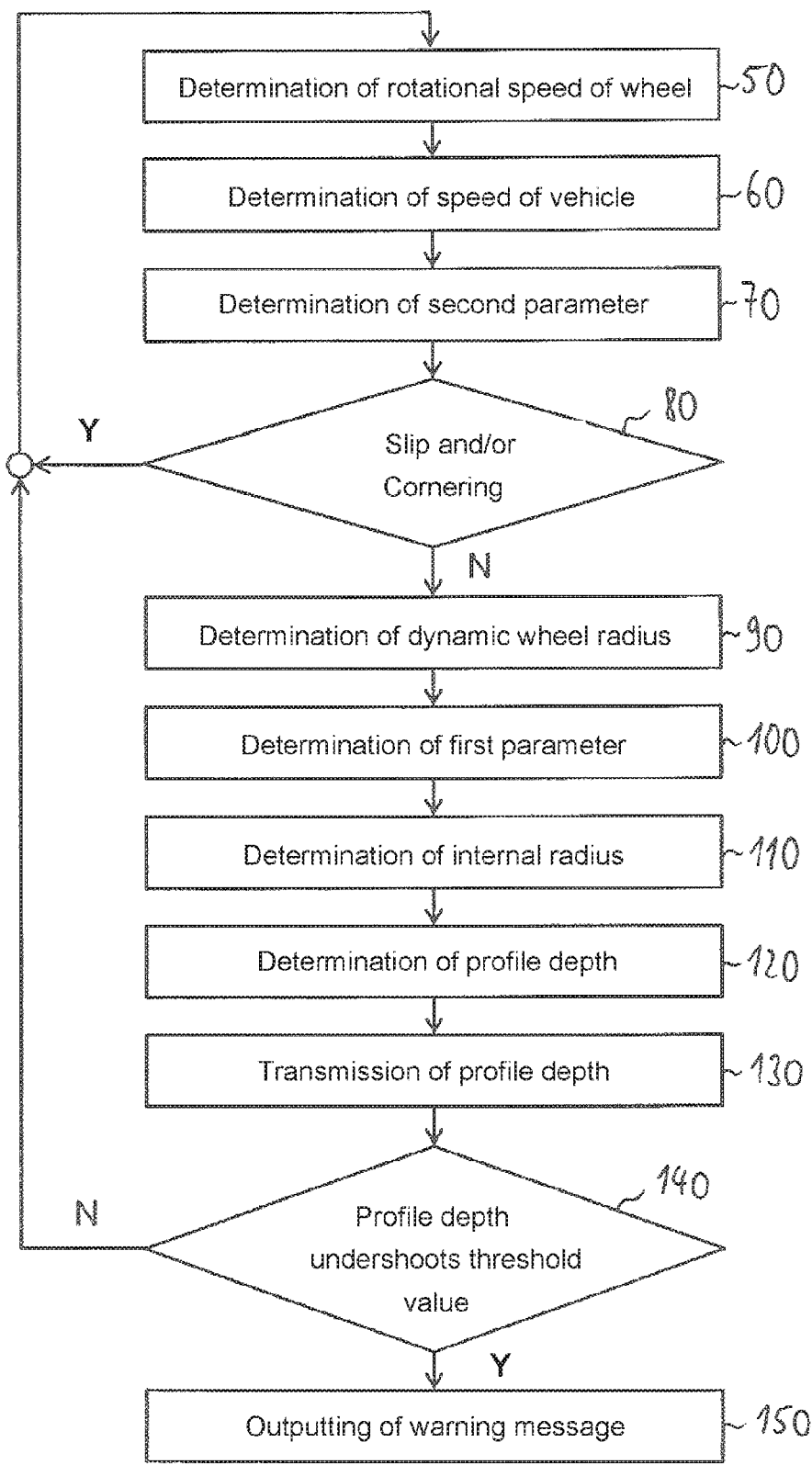
FIG. 2 shows a flowchart of a method for determining a tread depth of a tread of a tire according to a second embodiment.

FIG. 2 shows a flowchart of a method for determining a tread depth of a tread of a tire during operation of a vehicle having the tire, according to a second embodiment. The vehicle is, for example, again a passenger car or a truck.

In a step 50, an instantaneous rotational speed of a wheel of the vehicle having the tire is determined on the basis of data determined by at least one first sensor, corresponding to step 50 of the first embodiment shown in FIG. 1.

Furthermore, in a step 60, an instantaneous speed of the vehicle is determined on the basis of data determined by at least one second sensor which is different from the at least one first sensor, corresponding to the step 60 of the first embodiment shown in FIG. 1.

In a step 70, at least one second parameter is determined selected from the group composed of an instantaneous acceleration of the vehicle, an instantaneous yaw rate of the vehicle, an instantaneous steering angle, an instantaneous torque of a drive engine of the vehicle and an operating state of a brake device of the vehicle.

For this purpose, in a step 80, it is determined on the basis of the at least one determined second parameter whether the instantaneous driving situation constitutes a driving situation in which no slip or as little slip as possible occurs and in which the vehicle is traveling essentially in a straight line.

For example it is determined whether the at least one second parameter exceeds a predetermined threshold value or whether the brake device of the vehicle is activated at the time.

If it is determined in step 80 here that the instantaneous driving situation does not constitute a driving situation in which no slip or as little slip as possible occurs and in which the vehicle is traveling essentially in a straight line, for example if the second parameter exceeds the predetermined threshold value and/or the brake device is activated, the steps 50, 60, 70 and 80 are carried out repeatedly.

On the other hand, if it is determined in step 80 that the instantaneous driving situation constitutes a driving situation in which no slip or as little slip as possible occurs and in which the vehicle is traveling in an essentially straight line, for example if the second parameter does not exceed the predetermined threshold value and the brake device is not activated, in a step 90 an instantaneous dynamic radius of the wheel having the tire is determined on the basis of the determined instantaneous rotational speed and the determined instantaneous speed corresponding to step 90 of the embodiment shown in FIG. 1. A situation in which the influence of drive slip or brake slip is low is present, for example, if a driving situation with very low acceleration is detected, that is to say the longitudinal acceleration and the lateral acceleration are virtually zero, the brake device is not activated, the engine torque is also virtually zero, the change in the determined instantaneous speed of the vehicle over time is virtually zero, and the rotational speeds of all the wheels of the vehicle are approximately the same.

In addition, in a step 100, at least one first parameter of the tire is determined, selected from the group composed of an instantaneous tire temperature, an instantaneous tire pressure and an instantaneous tire load.

In a step 110, an instantaneous dynamic internal radius of the wheel is determined on the basis of the at least one determined parameter, and in a step 120 a tread depth of the tread of the tire is determined on the basis of the determined instantaneous dynamic radius and the determined instantaneous dynamic internal radius. The steps 100, 110 and 120 correspond here to the steps 100, 110 and 120 according to the first embodiment shown in FIG. 1.

In addition, the determined tread depth of the tread of the tire in the embodiment shown is transmitted, in a step 130, to at least one driver assistance system of the vehicle, for example to an ABS or ESP system.

In a step 140 it is determined whether the determined tread depth of the tread of the tire undershoots a predetermined threshold value, for example 2 mm.

If the determined tread depth does not undershoot the predetermined threshold value, the steps 50 to 80 and, if appropriate, 90 to 140 are carried out repeatedly.

In contrast, if the determined tread depth undershoots the predetermined threshold value, in a step 150 a warning message is issued by means of an output device of the vehicle. In addition, in this case a warning message can be transmitted automatically to further vehicles and/or a service device can be informed automatically, for example for the arrangement of an appointment.

In particular, by means of the methods according to the invention which are shown in FIGS. 1 and 2 it is possible to classify a change in the wheel radius as a change in tire pressure, as a change in load or as a temperature-related change. These effects can therefore be compensated and the remaining change in the wheel radius classified as a change in the tread depth.

As a result, by means of the specified methods an individual tire tread depth can be determined on the basis of a sensor fusion approach. This approach accesses here, for example, signals of a tire unit, of the ABS/ESP system and of the navigation system. In addition, it is possible to access signals of the engine controller, which can increase the accuracy of the determination.

It is also to be noted here that speed differences between wheels on the inside bends and on the outside bends when cornering should typically be negligible. Such influences can either be compensated, for example on the basis of yaw rate information and steering angle information, or driving situations can be identified in which bend effects hardly occur, for example by means of steering wheel angle information and yaw rate information or if the rotational speeds of all the wheels of the vehicle are approximately the same. For this purpose, a filter process is preferably used which permits only the driving situations described above with low slip or low bend effects and averages them over a certain time period.

The specified methods therefore make available a vehicle movement dynamics-based approach in order to estimate and/or determine the tread depth. In this context, it is assumed, for example, that the distance traveled, measured by means of a GPS system, over a predefined time period is related to the number of rotations of a tire which is measured, for example, by an ABS/ESP system. This relationship depends, in particular, on the dynamic wheel radius, which in turn depends on the tread depth.

Figure 3A:
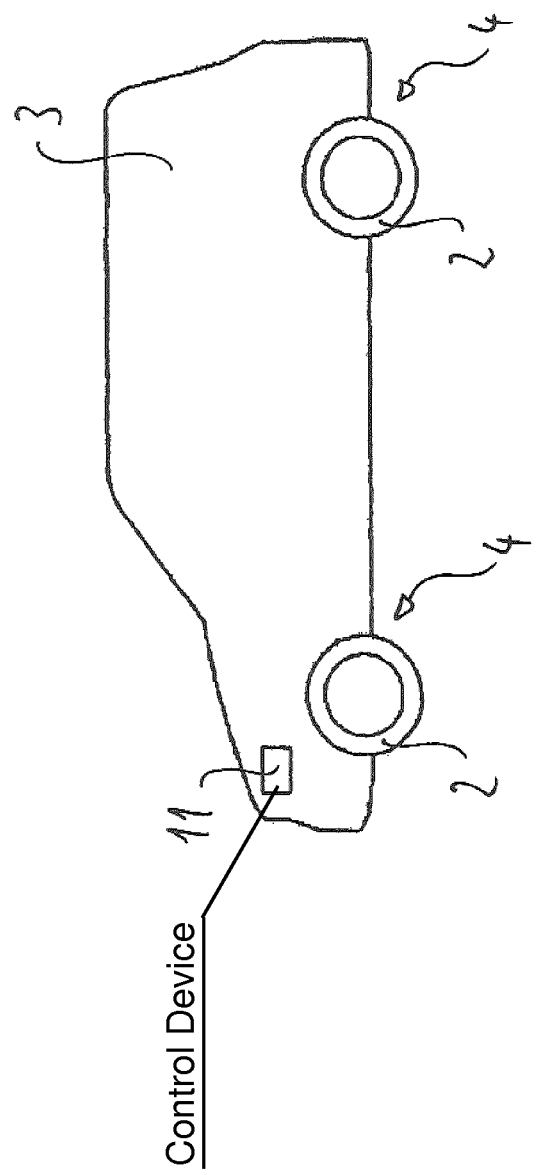
FIG. 3A shows a vehicle having a control device for determining a tread depth of a tread of a tire according to an embodiment.

FIG. 3A shows a schematic illustration of a vehicle 3 with a control device 11 for determining a tread depth of a tread of a tire 2 of at least one wheel 4 of the vehicle 3.

The vehicle 3 in the illustration shown is a motor vehicle in the form of a passenger car and it has, in total, four wheels, a front wheel and a rear wheel of which are shown in FIG. 3A. Further details are explained in more detail in relation to the following figures.

Figure 3B:
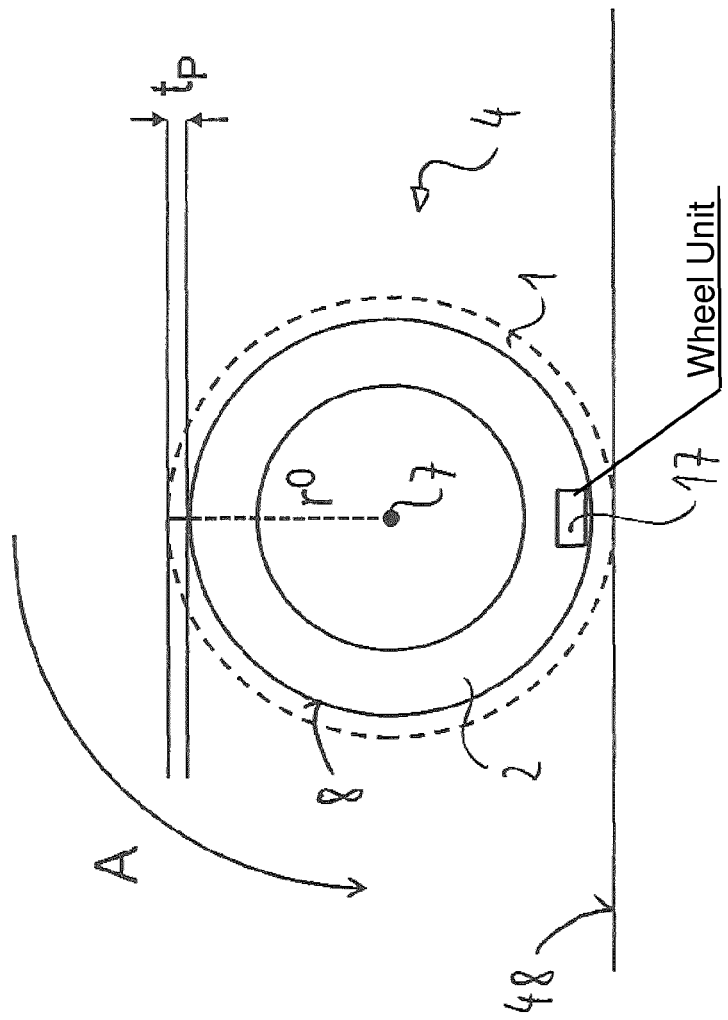
FIG. 3B shows a schematic cross section through one of the wheels of the vehicle shown in FIG. 3A.

In this respect, FIG. 3B shows a schematic cross section through one of the wheels 4 of the vehicle shown in FIG. 3A.

As is shown in FIG. 3B, the tire 2 of the wheel 4 has a tread 1 (illustrated schematically by means of an interrupted line) with a tread depth $t_P$. The wheel 4 has an internal radius $r^0$, wherein the internal radius $r^0$ of the wheel 4 is the distance between a wheel center 7 and a tire-side start 8 of the tread 1. The internal radius $r^0$ of the wheel 4 therefore indicates the radius of the wheel 4 without the tread 1 of the tire 2. Furthermore, a rolling direction of the wheel 4 is illustrated schematically in FIG. 3B by means of an arrow A.

In addition, in FIG. 3B a wheel unit 17 is shown which is arranged in the tire 2. If such a tire unit or wheel unit 17 is directly in the tire contact area, that is to say in the contact area between the roadway 48 and the tire 2, or on the inside of the tread, said tire unit or wheel unit 17 can additionally detect the interaction between the roadway 48 and the tire 2 directly, for example by means of an acceleration sensor, a shock sensor or a piezo element. In this instance, the individual tire load can be determined by measuring the length of the tire contact area in conjunction with measuring the tire pressure and possible measurement of the tire temperature and speed, that is to say the tire load is a function of the length of the tire contact area, of the tire pressure, of the temperature and of the speed.

As is explained in more detail below, by means of sensors of the wheel unit 17 which are not illustrated in more detail in FIG. 3B and on the basis of further determined parameters it is possible to determine an instantaneous tread depth of the tread 1 of the tire 2 during operation of the vehicle. When the value of the instantaneous tread depth is determined, it is assumed here, as already explained, that there is a rigid wheel which is equivalent to the wheel of the vehicle.

Figure 4:
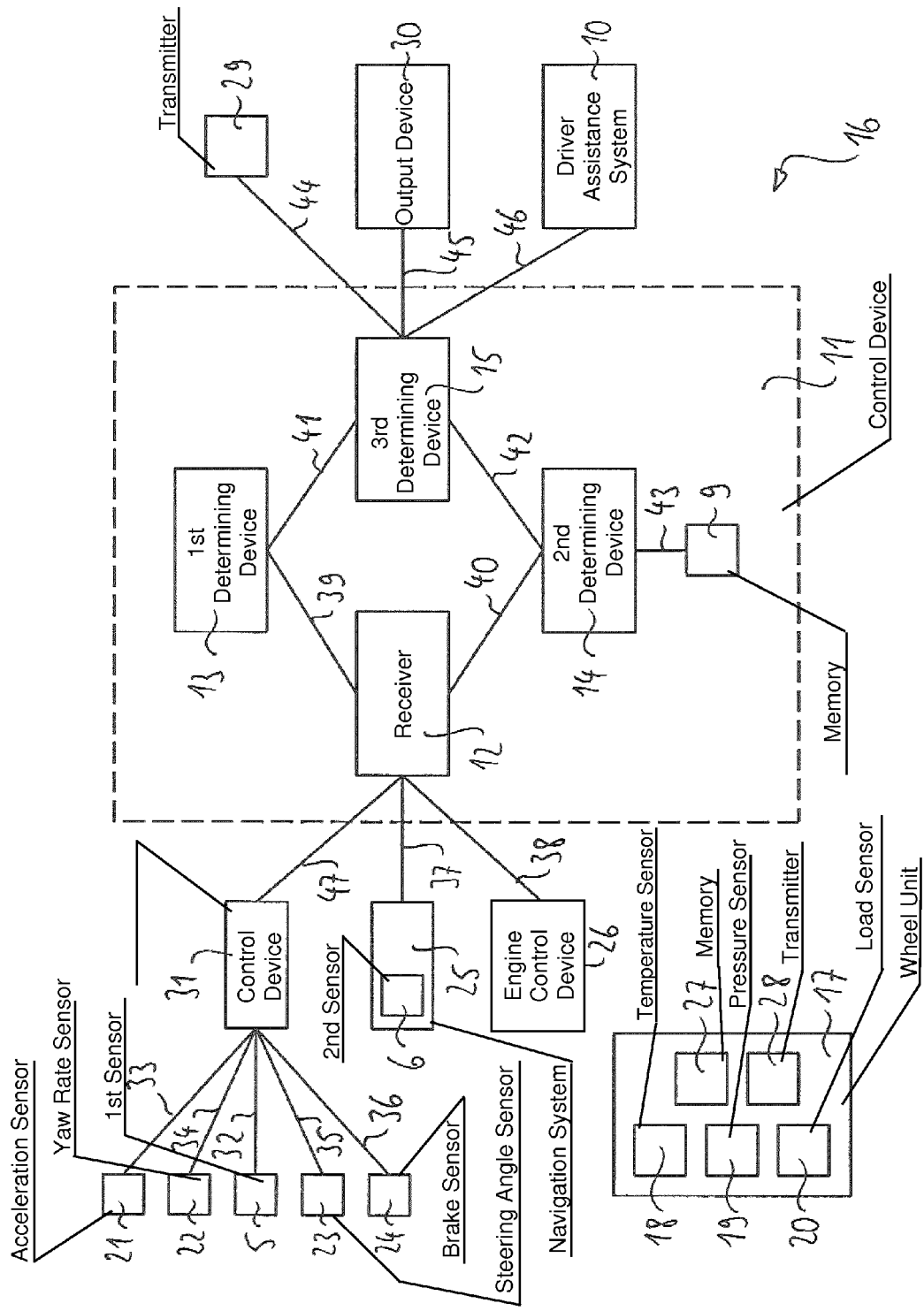
FIG. 4 shows a system for determining a tread depth of a tread of a tire according to an embodiment.

In this respect, FIG. 4 shows a system 16 for determining a tread depth of a tread of a tire of the vehicle which is not illustrated in more detail in FIG. 4. Components with the same functions as in FIGS. 3A and 3B are characterized with the same reference symbols and not explained again in the text which follows.

The system 16 has a control device 11 and a wheel unit 17 for each wheel or each tire of the vehicle, wherein for reasons of clarity only one such wheel unit 17 is illustrated in FIG. 4.

The wheel unit 17 can be arranged in the respective tire, and in the embodiment shown said wheel unit 17 has in each case a temperature sensor 18 for determining an instantaneous tire temperature, a pressure sensor 19 for determining an instantaneous tire pressure and a tire load sensor 20 for determining an instantaneous tire load. In addition, the wheel unit 17 has a memory device 27, wherein, for example, data relating to a type of the tire and/or the age of the tire can be stored in the memory device 27. In particular, characteristic tire properties such as, for example, the type of the tire, age, dimension, DOT number and treadwear rating, can be stored and made available. Furthermore, the wheel unit 17 has a transmitter device 28 by means of which the specified data can be transmitted to the control device 11.

The control device 11 has for this purpose a receiver device 12 which is designed to receive an instantaneous tire temperature value, an instantaneous tire pressure value and an instantaneous tire load value from the transmitter device 28.

In addition, the receiver device 12 is designed to receive an instantaneous rotational speed value of the wheel of the vehicle having the tire. For this purpose, the receiver device 12 is connected via a signal line 47 to a control device 31 which is embodied in the embodiment shown as an ABS or ESP control device. The control device 31 is also connected via a signal line 32 to a first sensor 5 in the form of a rotational angle sensor. In this context, each wheel of the vehicle is assigned a separate first sensor 5, wherein for reasons of clarity only one such first sensor 5 is illustrated in FIG. 4.

In addition, the control device 31 is connected via a signal line 33 to an acceleration sensor 21 which is designed to determine a longitudinal acceleration of the vehicle and a lateral acceleration of the vehicle. Furthermore, the control device 31 is connected via a signal line 34 to a yaw rate sensor 22, and via a signal line 35 to a steering angle sensor 23. Furthermore, the control device 31 is connected via a signal line 36 to a sensor 24 which is designed to determine an operating state of a brake device (not illustrated in more detail) of the vehicle. For example, the sensor 24 can transmit a brake light signal of the brake device to the control device 31. The data determined by the specified sensors is processed in the control device 31, and the values determined therefrom are transmitted to the receiver device 12.

The receiver device 12 is also connected via a signal line 37 to a navigation system 25 which has a second sensor 6 in the form of a position-determining sensor. On the basis of data determined by the second sensor 6, an instantaneous speed of the vehicle can be determined by the navigation system 25 and made available to the control device 11 by means of the receiver device 12.

In addition, the receiver device 12 is connected via a signal line 38 to an engine control device 26 of a drive engine (not illustrated in more detail) of the vehicle. As a result, an instantaneous torque of the drive engine can be transmitted to the control device 11.

The control device 11 also has a first determining device 13 which is designed to determine an instantaneous dynamic radius of the wheel having the tire, on the basis of the instantaneous rotational speed value received by the receiver device 12 and the received instantaneous speed value. For this purpose, the first determining device 13 is connected via a signal line 39 to the receiver device 12.

Furthermore, the control device 11 has a second determining device 14 which is designed to determine an instantaneous dynamic internal radius of the wheel on the basis of the received instantaneous tire temperature value, the received instantaneous tire pressure value, the received instantaneous tire load value as well as the type of the tire and/or the age of the tire. The age of the tire can be determined for example, on the basis of the date of manufacture stored in the memory device 27, as a result of which, in particular, it is possible to detect whether there is a novel tire which the system 16 is then able to learn about.

The second determining device 14 is connected here via a signal line 40 to the receiver device 12, and in the embodiment shown said determining device 14 is designed to determine the instantaneous dynamic internal radius of the wheel by means of a multiplicity of characteristic curves stored in a memory device 9. The memory device 9 is for this purpose connected via a signal line 43 to the second determining device 14.

The control device 11 also has a third determining device 15 which is designed to determine a tread depth of the tread of the tire on the basis of the determined instantaneous dynamic radius and the determined instantaneous dynamic internal radius. For this purpose, the third determining device 15 is connected via a signal line 41 to the first determining device 13 and via a signal line 42 to the second determining device 14.

The third determining device 15 is designed, in the embodiment shown, to determine whether the respective instantaneous driving situation constitutes a driving situation in which no slip or as little slip as possible occurs and in which the vehicle is traveling essentially in a straight line, on the basis of the values of the instantaneous acceleration of the vehicle, of the instantaneous yaw rate of the vehicle, of the instantaneous steering angle, of the instantaneous torque of the drive engine and of the operating state of the brake device which are received by the receiver device 12.

If the third determining device 15 determines here that the instantaneous driving situation does not constitute a driving situation in which no slip or as little slip as possible occurs and in which the vehicle is traveling essentially in a straight line, this information can be transmitted to the first determining device 13 and/or the second determining device 14, and the determination of the instantaneous dynamic radius or of the instantaneous dynamic internal radius can be omitted in these situations. For this purpose, in particular the signal lines 41 and 42 are embodied as bidirectional signal lines. In addition, in such situations the values which have already been determined during the determination of the tread depth can be ignored.

In addition, the third determining device 15 is designed in the embodiment shown to determine whether the determined tread depth of the tread of the tire undershoots a predetermined threshold value. If this is the case, a warning message can be output by means of an output device 30 of the vehicle and transmitted to further vehicles by means of a transmitter device 29. The third determining device 15 is for this purpose connected to the output device 30 via a signal line 45 and to the transmitter device 29 via a signal line 44.

In addition, the determined tread depth of the tread of the tire can be transmitted to a driver assistance system 10 of the vehicle. For this purpose, the third determining device 15 is connected via a signal line 46 to the driver assistance system 10, which is embodied, for example, as a brake assistant or emergency brake system.

The tread depth of a tire has here a decisive influence on the behavior of the vehicle. This applies, in particular, in critical driving situations. On the one hand, the maximum frictional engagement between the tire and the roadway, that is to say the grip, is heavily dependent on the respective properties of the roadway, for example the covering of the roadway or the presence of snow or ice on the roadway. On the other hand, the frictional engagement for the respective conditions can be optimized by specific tire properties.

These include, in particular, a tire tread which is optimized for the respective weather conditions. The effectiveness of the tire tread is decisively determined here by the tread depth. For example, in the case of aquaplaning the water between the roadway and the tire can no longer be expelled owing to a tread which is no longer sufficient.

As a result, the best possible frictional engagement between the tire and the roadway can be ensured by a sufficient tread depth, in particular in critical driving situations. For this reason there are typically legal requirements for a minimum tread depth which can also vary here according to the season.

The present invention advantageously makes available a method and a control device and a system with which the tread depth can be estimated and/or determined during travel. This information can be made available, in particular, to the driver so that the driver changes tires with an excessively low tread depth in good time. This makes it possible to avoid specific hazardous situations, in particular aquaplaning and a loss of grip on snow-covered roadways, and associated accidents.

Furthermore, the determined tread depth can be made available to other vehicle systems, in particular active safety systems, for example an ABS or ESP. This permits the respective regulation strategies of the reduced grip situation to be adapted and therefore optimized.

Furthermore, the medium-term time tread of the tread depth permits conclusions to be drawn about the change of tires according to the season. As a result it is possible to estimate whether the respective tire still has sufficient tread for the coming season or should be replaced.

LIST OF REFERENCE SYMBOLS 1 tread
2 tire
3 vehicle
4 wheel
5 sensor
6 sensor
7 wheel center
8 start
9 memory device
10 driver assistance system
11 control device
12 receiver device
13 determining device
14 determining device
15 determining device
16 system
17 wheel unit
18 temperature sensor
19 pressure sensor
20 tire load sensor
21 acceleration sensor
22 yaw rate sensor
23 steering angle sensor
24 sensor
25 navigation system
26 engine control device
27 memory device
28 transmitter device
29 transmitter device
30 output device
31 control device
32 signal line
33 signal line
34 signal line
35 signal line
36 signal line
37 signal line
38 signal line
39 signal line
40 signal line
41 signal line
42 signal line
43 signal line
44 signal line
45 signal line
46 signal line
47 signal line
48 roadway
50 step
60 step
70 step
80 step
90 step
100 step
110 step
120 step
130 step
140 step
150 step
A arrow

The invention claimed is:

1. A method for determining a tread depth of a tread of a tire during operation of a vehicle having the tire, the method comprising the following steps:
determining an instantaneous rotational speed of a wheel of the vehicle having the tire, based on data determined by at least one first sensor;
determining an instantaneous speed of the vehicle based on data determined by at least one second sensor, being different from the at least one first sensor;
determining an instantaneous dynamic radius of the wheel having the tire, based on the determined instantaneous rotational speed of the wheel and the determined instantaneous speed of the vehicle;
determining at least one first parameter of the tire selected from the group consisting of an instantaneous tire temperature, an instantaneous tire pressure and an instantaneous tire load;
determining an instantaneous dynamic internal radius of the wheel based on the at least one determined first parameter, the internal radius of the wheel being a distance between a wheel center and a tire-side start of the tread; and
determining the tread depth of the tread of the tire based on the determined instantaneous dynamic radius and the determined instantaneous dynamic internal radius.

2. The method according to claim 1, which further comprises providing the at least one first sensor as a rotational speed sensor.

3. The method according to claim 1, which further comprises selecting the at least one second sensor from the group consisting of a satellite-assisted position-determining sensor, a radar sensor, a lidar sensor, an ultrasonic sensor and an optical camera; and estimating the instantaneous speed of the vehicle based on the data determined by the at least one second sensor.

4. The method according to claim 1, which further comprises additionally determining the instantaneous dynamic internal radius of the wheel based on the determined instantaneous speed of the vehicle.

5. The method according to claim 1, which further comprises additionally determining the instantaneous dynamic internal radius of the wheel based on at least one of a type of tire or an age of the tire.

6. The method according to claim 1, which further comprises determining the instantaneous dynamic internal radius of the wheel by using at least one characteristic curve stored in a memory device.

7. The method according to claim 1, which further comprises:
 additionally determining at least one second parameter selected from the group consisting of an instantaneous acceleration of the vehicle, an instantaneous yaw rate of the vehicle, an instantaneous steering angle, and an instantaneous torque of a drive engine of the vehicle; and
 determining that the at least one second parameter does not exceed a predetermined threshold value and that a brake device of the vehicle is not activated before performing the steps of determining the instantaneous dynamic radius of the wheel and determining the instantaneous dynamic internal radius of the wheel.

8. The method according to claim 1, which further comprises additionally issuing a warning message if the determined tread depth of the tread of the tire undershoots a first predetermined threshold value.

9. The method according to claim 1, which further comprises additionally informing a service device if the determined tread depth of the tread of the tire undershoots a second predetermined threshold value.

10. The method according to claim 1, which further comprises transmitting the determined tread depth of the tread of the tire to at least one driver assistance system of the vehicle.

11. A control device for a vehicle for determining a tread depth of a tread of a tire of the vehicle, the control device comprising:
 at least one receiver device constructed to receive an instantaneous rotational speed of a wheel of the vehicle having the tire, an instantaneous speed of the vehicle and at least one first parameter of the tire selected from the group consisting of an instantaneous tire temperature, an instantaneous tire pressure and an instantaneous tire load;
 a first determining device constructed to determine an instantaneous dynamic radius of the wheel having the tire, based on the received instantaneous rotational speed of the wheel and the received instantaneous speed of the vehicle;
 a second determining device constructed to determine an instantaneous dynamic internal radius of the wheel based on the at least one received first parameter, the internal radius of the wheel being a distance between a wheel center and a tire-side start of the tread; and
 a third determining device constructed to determine the tread depth of the tread of the tire based on the determined instantaneous dynamic radius and the determined instantaneous dynamic internal radius.

12. A system for a vehicle for determining a tread depth of a tread of a tire of the vehicle, the system comprising:
 a control device according to claim 11; and
 at least one wheel unit constructed to be disposed in the tire and having at least one sensor selected from the group consisting of a temperature sensor, a pressure sensor and a tire load sensor.

* * * * *